United States Patent
Sanai

(10) Patent No.: US 7,799,844 B2
(45) Date of Patent: Sep. 21, 2010

(54) ACTIVE ENERGY BEAM-CURABLE COMPOSITION FOR OPTICAL MATERIAL

(75) Inventor: Yasuyuki Sanai, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 884 days.

(21) Appl. No.: 10/578,623

(22) PCT Filed: Nov. 5, 2004

(86) PCT No.: PCT/JP2004/016413

§ 371 (c)(1),
(2), (4) Date: May 8, 2006

(87) PCT Pub. No.: WO2005/044882

PCT Pub. Date: May 19, 2005

(65) Prior Publication Data

US 2007/0043143 A1    Feb. 22, 2007

(30) Foreign Application Priority Data

Nov. 7, 2003    (JP) ............................. 2003-378898
Nov. 7, 2003    (JP) ............................. 2003-378904

(51) Int. Cl.
| | |
|---|---|
| C08F 2/46 | (2006.01) |
| C08F 20/18 | (2006.01) |
| C08F 20/30 | (2006.01) |
| C08F 12/30 | (2006.01) |
| C08F 28/04 | (2006.01) |
| C08F 22/24 | (2006.01) |
| C08F 20/26 | (2006.01) |
| B29C 35/08 | (2006.01) |

(52) U.S. Cl. .................. 522/180; 522/182; 522/154; 264/496; 526/286; 526/318.1; 526/318.41; 526/326

(58) Field of Classification Search ............... 522/180, 522/154, 182; 359/456, 581; 264/496; 526/286, 526/318.1, 318.41, 326
See application file for complete search history.

(56) References Cited

U.S. PATENT DOCUMENTS 5,969,867 A * 10/1999 Fukushima et al. ......... 359/581

FOREIGN PATENT DOCUMENTS

| JP | 61-177215 A | 8/1986 |
|---|---|---|
| JP | 61-248707 A | 11/1986 |
| JP | 61-248708 A | 11/1986 |
| JP | 63-163330 A | 7/1988 |
| JP | 63-167301 A | 7/1988 |
| JP | 63-199302 A | 8/1988 |
| JP | 1-180854 A | 7/1989 |
| JP | 4-202308 A | 7/1992 |
| JP | 7-268045 A | 10/1995 |
| JP | 8-208775 A | 8/1996 |
| JP | 9-87336 A | 3/1997 |
| JP | 09235338 A * | 9/1997 |
| JP | 2002-293826 A | 10/2002 |
| JP | 3397448 B2 | 4/2003 |
| WO | WO 03/064535 A1 | 8/2003 |

OTHER PUBLICATIONS

English machine translation and abstract of JP 09-235338.*
International Search Report for PCT/JP04/016413 dated Jan. 25, 2005.

* cited by examiner

*Primary Examiner*—Randy Gulakowski
*Assistant Examiner*—Michael Pepitone
(74) *Attorney, Agent, or Firm*—Sughrue Mion, PLLC

(57) ABSTRACT

An active energy beam-curable composition for optical material is provided that comprises (A) a di(meth)acrylate represented by the following formula (1) and (B) a mono(meth)acrylate represented by the following formula (2) and/or a mono(meth)acrylate represented by the following formula (3), wherein the active energy beam-curable composition contains 10 to 90 wt % of the component (A) and 90 to 10 wt % the component (B) on the basis of the total weight of the components (A) and (B).

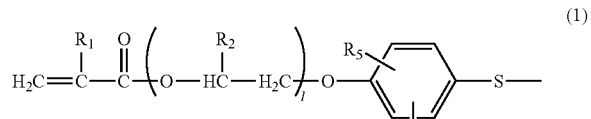

(1)

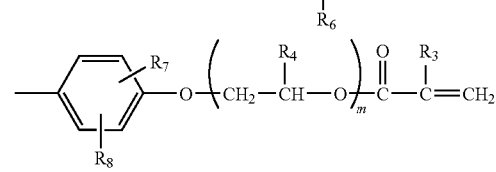

(2)

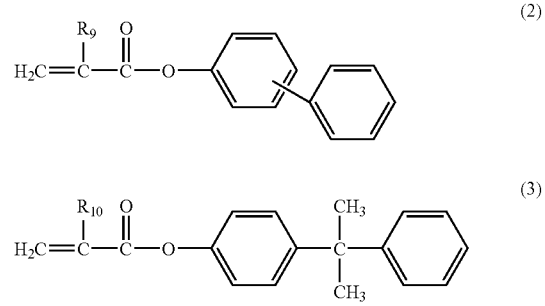

(3)

In the formula, $R_1$ and $R_3$ independently represents a hydrogen atom or a methyl group, $R_2$ and $R_4$ independently represents a hydrogen atom, a methyl group or an ethyl group, $R_5$ to $R_8$ independently represents a hydrogen atom, a methyl group or a bromine atom, and l and m independently represents an integer of 1 to 6, $R_9$ represents a hydrogen atom or a methyl group, $R_{10}$ represents a hydrogen atom or a methyl group.

30 Claims, No Drawings

ACTIVE ENERGY BEAM-CURABLE COMPOSITION FOR OPTICAL MATERIAL

BACKGROUND OF THE INVENTION

1. Field of the Invention

The present invention relates to an active energy beam-curable composition for optical materials, and belongs to the technical field of an active energy beam-curable composition and an optical material such as a lens sheet, a plastic lens and the like.

2. Description of the Related Art

Conventionally, a lens sheet such as a Fresnel lens, a lenticular lens and the like is manufactured by molding using a method such as a press method, a cast method and the like.

However, the former press method has such problem that the productivity is low because the production is carried out by a cycle of heating, pressurizing and cooling. On the other hand, the latter cast method has such problem as an increased production cost due to a lot of necessary molds in addition to a long production time because of a process in which a monomer is cast in a mold to polymerize.

On the other hand, since an active energy beam-curable composition has quick curability and is excellent in productivity, various suggestions have been made about an active energy beam-curable composition for producing a lens sheet in order to solve the above-mentioned problems (for example, JP-A-61-177215 (Claim), JP-A-61-248707 (Claim), JP-A-61-248708 (Claim), JP-A-63-163330 (Claim), JP-A-63-167301 (Claim) and JP-A-63-199302 (Claim), JP-A denotes a Japanese unexamined patent application publication).

However, conventional active energy beam-curable compositions are insufficient in refractive index and transparency. In order to improve the point, a composition is examined in which a bisphenol-type di(meth)acrylate and a mono(meth)acrylate having an aromatic ring are used in a combination (for example, JP-A-9-87336 (Claim) and Japanese Patent No. 3397448 (Claim)).

BRIEF SUMMARY OF THE INVENTION

However, in an active energy beam-curable composition for use in optical applications, the above-mentioned composition is insufficient for applications wherein a higher refractive index and transparency are required as is the case for thickness reduction of a projection television and the like.

Further, with respect to an active energy beam-curable composition for use in optical applications, dimensional stability of an obtained cured article is required in addition to these optical characteristics. That is, when a cured article has a high water absorption, it absorbs water with a lapse of time to result in dimension change, whereby unevenness of optical characteristics may generate, or peeling or deformation of an element may occur.

The present inventor made an intensive investigation in order to find an active energy beam-curable composition for optical materials to give a cured article having a high refractive index, high light transmittance and, in addition, low water absorption to be excellent in dimensional stability.

The present inventor carried out various studies in order to solve the above-mentioned problem to find that a composition containing specific 2 types of (meth)acrylates cures rapidly with an active energy beam, and that the cured article has a high refractive index and is excellent in light transmittance, thereby completing the present invention.

The present invention will be described in detail below.

In the present invention, "acrylate or methacrylate" will be represented as "(meth)acrylate".

DETAILED DESCRIPTION OF THE INVENTION

The present invention relates to an active energy beam-curable composition for optical materials including (A) a di(meth)acrylate represented by formula (1) below and (B) a mono(meth)acrylate represented by formula (2) below and/or a mono(meth)acrylate represented by formula (3) below, wherein the composition contains the component (A) in 10 to 90 wt % and the component (B) in 90 to 10 wt % on the basis of the total weight of the components (A) and (B).

Description will be given below about respective components.

1. Component (A)

The component (A) is a di(meth)acrylate represented by the following formula (1).

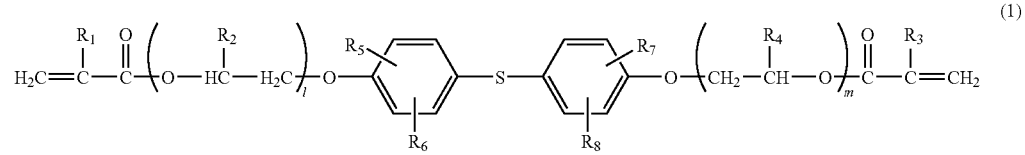

wherein $R_1$ and $R_3$ each independently represents a hydrogen atom or a methyl group, $R_2$ and $R_4$ independently represents a hydrogen atom, a methyl group or an ethyl group, $R_5$ to $R_8$ independently represents a hydrogen atom, a methyl group or a bromine atom, and l and m independently represents an integer of 1 to 6.

As to $R_1$ and $R_3$, each of them is preferably a hydrogen atom because a composition having an excellent curability is resulted in. As to $R_2$ and $R_4$, each of them is preferably a hydrogen atom because the refractive index of a cured article to be obtained is excellent. As to $R_5$ to $R_8$, preferably all of $R_5$ to $R_8$ are hydrogen atoms; $R_5$ is a hydrogen atom and $R_6$ is a methyl group, and $R_7$ is a hydrogen atom and $R_8$ is a methyl group; or $R_5$ is a hydrogen atom and $R_6$ is a bromine atom, and $R_7$ is a hydrogen atom and $R_8$ is a bromine atom; because the component (A) is produced with a high yield and, further, the cured article to be obtained is excellent in the refractive index.

Preferably each of l and m is an integer of 1 to 3, because the cured article to be obtained is excellent in the refractive index.

Specific examples of the component (A) include bis(4-methacryloxyethoxyphenyl) sulfide, bis(4-acryloxyethoxyphenyl)sulfide, bis(4-methacryloxydiethoxyphenyl) sulfide, bis(4-acryloxydiethoxyphenyl)sulfide, bis(4-methacryloxytriethoxyphenyl)sulfide, bis(4-acryloxytriethoxyphenyl) sulfide, bis(4- methacryloxydiethoxy-3-methylphenyl)sulfide, bis(4-acryloxydiethoxy-3-methylphenyl) sulfide, bis(4-methacryloxyethoxy-3-bromophenyl) sulfide, bis(4-acryloxyethoxy-3-bromophenyl)sulfide, bis(4-methacryloxydiethoxy-3-bromophenyl) sulfide, bis(4-acryloxydiethoxy-3-bromophenyl) sulfide and the like.

Among these, since excellent curability is resulted in, bis (4-acryloxyethoxyphenyl) sulfide, bis(4-acryloxydiethoxyphenyl)sulfide, bis(4-acryloxyethoxy-3-methylphenyl) sulfide and bis(4-acryloxydiethoxy-3-methylphenyl) sulfide are more preferable.

These components (A) may be used singly or in a combination of 2 or more types.

2. Component (B)

The component (B) is a (meth)acrylate represented by the following formula (2) (hereinafter referred to as (B-1)), and/or a mono(meth)acrylate represented by the following formula (3) (hereinafter referred to as (B-2)), which is a component that gives a high refractive index and low water absorption to a cured article of the composition, and that makes the composition liquid to lead to easy handling.

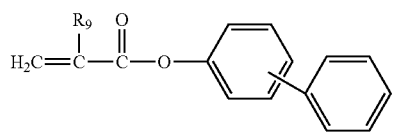
(2)

wherein $R_9$ represents a hydrogen atom or a methyl group.

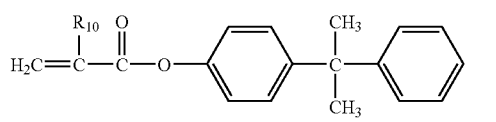
(3)

wherein $R_{10}$ represents a hydrogen atom or a methyl group.

Specific examples of the component (B-1) include o-phenylphenyl (meth)acrylate, m-phenylphenyl(meth)acrylate and p-phenylphenyl (meth)acrylate.

Among these, o-phenylphenyl(meth)acrylate is preferable because it is liquid at room temperature and easy to handle, and easily available.

In this connection, (meth)acrylates having one phenyl group or compounds having an alkylene oxide group, which being different from the component (B-1) of the present invention, can not give a cured article of the composition having a high refractive index and, in addition, gives a cured article having a high water absorption.

Specific example of the component (B-2) includes p-cumylphenol (meth)acrylate.

In this connection, (meth)acrylates having one phenyl group and being different from the component (B-2) of the present invention can not give a cured article of the composition having a high refractive index.

The components (B-1) and (B-2) may be used singly or in a combination of two or more types.

When the components (B-1) and (B-2) are used in a combination, the preferable ratio is 10 to 90 wt % of the component (B-1) and 90 to 10 wt % of the component (B-2).

3. Other Components

The composition of the present invention is a composition that cures by irradiation of an active energy beam, wherein the active energy beam includes an electron beam, visible rays, ultraviolet rays and the like. Among these, visible rays or ultraviolet rays are preferable because they do not require a particular apparatus and easy to use.

In order to prepare a visible ray- or ultraviolet ray-curable composition, the composition is blended with a photopolymerization initiator. Here, in order to prepare an electro beam-curable composition, a photopolymerization initiator is not necessarily blended.

Specific examples of the photoinitiator (hereinafter, referred to as a component (C)) include benzoins such as benzoin, benzoin methyl ether and benzoin propyl ether; acetophenones such as acetophenone, 2,2-dimethoxy-2-phenylacetophenone, 2,2-diethoxy-2-phenylacetophenone, 1,1-dichloroacetophenone, 1-hydroxycyclohexylphenyl ketone, 2-methyl-1-[4-(methylthio) phenyl]-2-morpholino-porpane-1-one and N,N-dimethylaminoacetophenone; anthraquinones such as 2-methylanthraquinone, 1-chloroanthraquinone and 2-amylanthraquinone; thioxanthones such as 2,4-dimethylthioxanthone, 2,4-diethylthioxanthone, 2-chlorothioxanthone and 2,4-diisopropylthioxanthone; ketals such as acetophenone dimethylketal and benzyl dimethylketal; benzophenones such as benzophenone, methylbenzophenone, 4,4'-dichlorobenzophenone, 4,4'-bisdiethylaminobenzophenone, Michler's ketone and 4-benzoyl-4'-methyldiphenyl sulfide; and 2,4,6-trimethylbenzoyldiphenylphosphine oxide.

These components (C) may be used singly or in a combination of two or more types.

The component (C) may be used in a combination with a photosensitizer according to need. Examples of the photosensitizer include N,N-dimethylaminobenzoic acid ethyl ester, N,N-dimethylaminobenzoic acid isoamyl ester, triethylamine, triethanolamine and the like.

The blending percentage of the component (C) is preferably 0.05 to 12 parts by weight, more preferably 0.1 to 5 parts by weight, relative to the total 100 parts by weight of the components (A) and (B), or, when an unsaturated group-containing compound to be described below is blended, relative to the total 100 parts by weight of the components (A) and (B) and the unsaturated group-containing compound.

The composition of the present invention may be blended with an unsaturated group-containing compound other than the components (A) and (B) according to need.

Examples of the unsaturated group-containing compound include phenoxyethyl(meth)acrylate, carbitol (meth)acrylate, N-vinyl caprolacton, acryloyl morpholine, glycidyl (meth)acrylate, 2-hydroxyethyl(meth)acrylate, 2-hydroxypropyl (meth)acrylate, 1,4-butanediol mono(meth)acrylate, 1,6-hexanediol di(meth)acrylate, nonanediol diacrylate, polyethylene glycol di(meth)acrylate, 2-hydroxy-3-phenyloxypropyl(meth)acrylate, tribromophenyl (meth)acrylate, 2,2-bis(4-(meth)acryloyloxyethoxyphenyl)-propane, 2,2-bis (4-(meth) acryloyloxydiethoxyphenyl)-propane, 2,2-bis(4-(meth) acryloyloxytriethoxyphenyl)-propane, ethylene glycol di(meth)acrylate, tribromophenyloxyethyl(meth) acrylate, trimethylolpropane tri(meth)acrylate, pentaerythritol tetra(meth)acrylate, bisphenol A epoxy resin di(meth)acrylate, various types of polyurethane poly(meth) acrylate and polyester poly(meth)acrylate, and the like.

The unsaturated group-containing compound is preferably blended in the composition in a range of 0 to 50 wt %.

In addition to the above-mentioned components, according to need, pigment, dye, an antifoaming agent, a leveling agent, an inorganic filler, an organic filler, a light stabilizer, an oxidation inhibitor, an ultraviolet absorbing agent or the like may be blended. Further, according to need, a small amount of an oxidation inhibitor, a light stabilizer, an ultraviolet absorbing agent or a polymerization inhibitor may also be added.

For the purpose of further proceeding of cure, the composition of the present invention may be blended with a thermal polymerization initiator and heated after irradiation of an active energy beam.

As the thermal polymerization initiator, various compounds may be used, and an organic peroxide or an azo-based initiator is preferable.

Specific examples of the organic peroxide include 1,1-bis (t-butylperoxy)-2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-butylperoxycyclohexyl) propane, 1,1-bis(t-butylperoxy)cyclododecane, t-hexylperoxyisopropyl monocarbonate, t-butyl peroxy maleic acid, t-butyl peroxy-3,5,5-trimethyl hexanoate, t-butyl peroxylaurate, 2,5-dimethyl-2,5-di(m-toluoylperoxy)hexane, t-butyl peroxy isopropyl monocarbonate, t-butyl peroxy-2-ethylhexyl monocarbonate, t-hexyl peroxybenzoate, 2,5-dimethyl-2,5-di (benzoylperoxy)hexane, t-butyl peroxyacetate, 2,2-bis(t-butylperoxy) butane, t-butyl peroxybenzoate, n-butyl-4,4-bis(t-butylperoxy) valerate, di-t-butylperoxy isophthalate, α,α'-bis (t-butylperoxy)diisopropylbenzene, dicumyl peroxide, 2,5-dimethyl-2, 5-di (t-butylperoxy)hexane, t-butylcumyl peroxide, di-t-butyl peroxide, p-menthane hydroperoxide, 2,5-dimethyl-2,5-di(t-butylperoxy)hexyne-3, diisopropylbenzene hydroperoxide, t-butyltrimethylsilyl peroxide, 1,1, 3,3-tetramethylbutyl hydroperoxide, cumene hydroperoxide, t-hexylhydro peroxide, t-butyl hydroperoxide and the like.

Specific examples of the azo-based compound include 1,1'-azobis (cyclohexane-1-carbonitrile), 2-(carbamoylazo) isobutylonitrile, 2-phenylazo-4-methoxy-2, 4-dimethylvaleronitrile, azodi-t-octane, azodi-t-butane and the like.

These compounds may be used singly or in a combination of two or more types. Further, the organic peroxide may be combined with a reducing agent to lead to a redox reaction.

4. The Active Energy Beam-Curable Composition for Optical Material

The present invention requires the above-mentioned component (A) and the component (B) as indispensable components.

The ratio of the component (A) and the component (B) is, on the basis of the total weight of the components (A) and (B), 10 to 90 wt % of the component (A) and 90 to 10 wt % of the component (B), and preferably 30 to 90 wt % of the component (A) and 70 to 10 wt % of the component (B). The ratio of the component (A) less than 10 wt % can not give a designed refractive index and, on the other hand, the ratio of the component (A) more than 90 wt % may allow the composition to become solid at room temperature, thereby creating problems for workability.

The composition of the present invention can be produced by stirring and mixing the above-mentioned components (A) and (B), and other component as necessary, according to an ordinary method.

When the component (A) or the component (C) is solid, as necessary, it may be heated after the stirring and mixing, wherein 50 to 100° C. is preferable.

The production method of an optical material employing the composition of the present invention may be an ordinary method. For example, there can be mentioned such method that the composition is applied or poured to a casting mold having a predetermined shape, onto which a transparent substrate is put according to need, followed by irradiation of an active energy beam to cure the composition, and then the cured article is taken out of the casting mold.

The active energy beam includes an electron beam, visible rays, ultraviolet rays and the like. Among these, visible rays or ultraviolet rays are preferable because they do not require a particular apparatus and are easy to use. As an ultraviolet ray irradiation apparatus, there is a high-pressure mercury vapor lamp or the like.

The irradiation dose, irradiation time and the like of an active energy beam may be suitably set in accordance with the composition used and application.

The composition of the present invention can give a cured article having such high refractive index (25° C.) as normally 1.59 or more, and preferably 1.60 or more. In addition, the cured article is also excellent in transparency.

As described above, since a cured article of the composition of the present invention has a high refractive index and transparency, it can be used for various optical materials such as a lens sheet including a Fresnel lens, a lenticular lens, a prism sheet and the like, and a plastic lens.

In more detail, there are such applications for the lens sheet as a video projector, a projection television, liquid crystal display and the like.

An example of producing a lens sheet using the composition of the present invention is explained.

When a lens sheet having a relatively thin film thickness is to be produced, the composition of the present invention is applied to a casting mold, which is referred to as a stamper, having an intended lens shape to provide a layer of the composition, and then a transparent substrate is stuck.

Next, an active energy beam is irradiated from the side of the transparent substrate to cure the composition, and then, the cured article is peeled off the mold.

On the other hand, when a lens sheet having a relatively thick film thickness is to be produced, the composition of the present invention is poured between a casting mold having an intended lens shape and a transparent substrate.

Then, an active energy beam is irradiated from the side of the transparent substrate to cure the composition, and then, the cured article is demolded from the mold.

The transparent substrate is preferably a resin substrate, and specific examples thereof include a sheet-like methacrylic resin, polycarbonate resin, methyl methacrylate-styrene resin, styrene resin and the like.

The material of casting mold is not particularly restricted, and includes, for example, metals such as brass and nickel, and resins such as epoxy resin. From the viewpoint of a long lifetime of a casting mold, a mold of metal is preferable.

Next, an example of producing a plastic lens using the composition of the present invention is explained.

For example, there is such method that the composition of the present invention is injected into a mirror finished casting mold having at least one transparent surface and exposed to an active energy beam to cure, which is then demolded.

Examples of the casting mold in this case include a mold of two mirror finished glasses, plastics or a combination thereof and a gasket made of a thermoplastic resin such as plasticized vinyl chloride and ethylene-vinyl acetate copolymer, one constituted by combining two molds and a mold clamper, and the like.

In this case, an active energy beam may be irradiated to one or both sides of the casting mold. Further, the irradiation of an active energy beam may be combined with heating.

The composition of the present invention is excellent in workability at room temperature, and gives a cured article having a high refractive index, in addition, a good light transmittance and further low water absorption to exert an excellent dimensional stability. Accordingly, the composition of the present invention can be suitably used for optical elements such as a lens sheet and plastic lens for which a high refractive index, high light transmittance, high dimensional stability and the like are required.

The composition of the present invention contains 10 to 90 wt % of the component (A) and 90 to 10 wt % of the component (B) as indispensable components. As the component (A), since a cured article of the composition gives a high refractive index, diacrylates in which each of $R_1$ and $R_3$ is a hydrogen, atom are preferable. As the composition, one containing the component (C) is preferable.

In addition, the present invention provides a method for producing an optical material including the steps of applying or pouring the composition to a casting mold having a predetermined shape, and then irradiating an active energy beam to the composition.

EXAMPLES

The present invention will be further specifically described below with reference to Examples and Comparative examples.

In this connection, in what follows, "part" means "part by weight."

Examples and Comparative Examples

Respective components shown in Table 1 were stirred and mixed according to an ordinary method, and a solid photoinitiator was heated and dissolved in a dryer having been maintained previously at 80° C. over 15 minutes to prepare an ultraviolet-curable composition.

The obtained composition was applied to an OPP film by a bar coater at room temperature to give a thickness of 30 μm, which was cured by irradiating ultraviolet rays twice with a high-pressure mercury vapor lamp of an output power of 80 W/cm under the condition of a conveyer speed of 10 m/min and a lamp height of 10 cm.

The obtained cured article was evaluated by means of the following method. The result is listed in Table 2.

(1) Workability

The treatability of the composition upon manufacturing a cured article was evaluated. The composition that is liquid at room temperature is denoted by "Excellent", and one that is solid or pasty is denoted by "Poor".

(2) Refractive Index

The refractive index of the cured article (measured value at 25° C. using the sodium D line) was measured by an Abbe refractometer DR-M2 manufactured by ATAGO CO., LTD.

(3) Light Transmittance

The light transmittance of the cured article at the wavelength of 400 nm was measured by V-550 manufactured by JASCO Corporation.

(4) Water Absorption

Resin plates were put all around a glass flat plate to form an empty space having a thickness of 0.4 mm. The empty space was filled with the obtained composition, on which a glass flat plate was put.

The composition was exposed to the ultraviolet ray under the same condition as described above. After curing, the glass flat plate was removed to give a sheet of the cured article having a thickness of 0.4 mm.

The obtained sheet of the cured article was cut out to 5 cm×5 cm to prepare a test piece.

The test piece was heated at 210° C. for 1 hour in nitrogen to completely dry the cured article followed by standing to cool in a desiccator, and then weighed (W1). Then, the test piece was dipped in distilled water at 80° C. for 20 hours. After lightly wiping the surface of the taken out test piece, the test piece was weighed (W2) to calculate the water absorption according to the following formula.

$$\text{Water absorption (\%)}=100\times(W2-W1)/W1$$

TABLE 1

| | Composition (part) | | | | | | | |
| --- | --- | --- | --- | --- | --- | --- | --- | --- |
| | (A) | (B) | | Others | | | | (C) |
| | BAEPS | o-PPA | p-CPA | M-211B | M-400 | POA | TO-1463 | Irg184 |
| Example 1 | 50 | 50 | | | | | | 5 |
| 2 | 70 | 30 | | | | | | 5 |
| 3 | 80 | 20 | | | | | | 5 |
| 4 | 70 | 25 | | | 5 | | | 5 |
| 5 | 70 | 20 | | | 10 | | | 5 |
| 6 | 50 | | 50 | | | | | 5 |
| 7 | 70 | | 30 | | | | | 5 |
| 8 | 80 | | 20 | | | | | 5 |
| Comp. example 1 | 50 | | | | | 50 | | 5 |
| 2 | 100 | | | | | | | 5 |
| 3 | | 20 | | 80 | | | | 5 |
| 4 | | | 50 | 50 | | | | 5 |
| 5 | 70 | | | | | | 30 | 5 |
| 6 | 80 | | | | | | 20 | 5 |

In the Table 1, abbreviated expressions have following meanings.
BAEPS: bis-(4-acryloxyethoxyphenyl) sulphide
o-PPA: o-phenylphenyl acrylate
p-CPA: p-cumylphenyl acrylate
M-211B: ethylene oxide 4-mole modified diacrylate of bisphenol A, Aronix M-211B manufactured by TOAGOSEI CO., LTD.

TABLE 1-continued

| | Composition (part) | | | | | | |
|---|---|---|---|---|---|---|---|
| (A) | (B) | | Others | | | | (C) |
| BAEPS | o-PPA | p-CPA | M-211B | M-400 | POA | TO-1463 | Irg184 |

M-400: a mixture of dipentaerythritol penta- and hexa-acrylates, Aronix M-400 manufactured by TOAGOSEI CO., LTD.
POA: phenoxyethyl acrylate
TO-1463: ethylene oxide one-mole modified acrylate of o-phenylphenol, Aronix TO-1463 manufactured by TOAGOSEI CO., LTD.
Irg184: 1-hydroxycyclohexylphenyl ketone, IRGACURE184, manufactured by Ciba Specialty Chemicals K.K.

TABLE 2

| | Evaluation result | | | |
|---|---|---|---|---|
| | Workability | Refractive index | Light transmittance (%) | Water absorption (%) |
| Example 1 | Excellent | 1.6110 | 95 | 0.41 |
| 2 | Excellent | 1.6093 | 96 | 0.49 |
| 3 | Excellent | 1.6070 | 95 | 0.50 |
| 4 | Excellent | 1.6039 | 96 | 0.55 |
| 5 | Excellent | 1.6008 | 96 | 0.57 |
| 6 | Excellent | 1.5992 | 96 | 0.35 |
| 7 | Excellent | 1.6011 | 97 | 0.48 |
| 8 | Excellent | 1.6021 | 97 | 0.58 |
| Comparative examples 1 | Excellent | 1.5831 | 95 | 1.28 |
| 2 | Poor | Non | Non | Non |
| 3 | Excellent | 1.5720 | 96 | 1.50 |
| 4 | Excellent | 1.5750 | 97 | 1.20 |
| 5 | Excellent | 1.6046 | 97 | 0.72 |
| 6 | Excellent | 1.6058 | 96 | 0.80 |

As is clear from Table 2, the composition of the present invention is excellent in workability, and the refractive index of the cured article of the composition has such high refractive index as 1.59 or more, and has a good light transmittance and low water absorption.

On the other hand, when a composition, which contained the component (A) and a phenoxyethyl acrylate having only one phenyl group in the molecule and being different from the component (B), was used (Comparative example 1), a cured article having a high refractive index and low water absorption could not be obtained. A composition that used the component (A) alone (Comparative example 2) was solid at room temperature to exhibit poor workability, and could not give a cured article. Compositions that contained the component (B) but did not contain the component (A) (Comparative examples 3 and 4) could not give a cured article having a high refractive index and low water absorption. Compositions using a compound having an alkylene oxide unit differing from that of the component (B) (Comparative examples 5 and 6) could give a cured article having an excellent workability and optical properties such as refractive index, however, they could not give a cured article having a low water absorption.

Application Example

Production of Lens Sheet

Each of compositions obtained in Examples 1 to 8 was poured to a mold having a lens shape, on which a methacrylic resin plate as a transparent substrate was arranged.

The composition was irradiated with the ultraviolet ray through the transparent substrate under the same condition as described above to cure.

The cured article was taken off the mold to give a lens sheet having an intended shape and being excellent in optical properties and the like as described above.

The composition of the present invention can suitably be used, as an active energy beam-curable composition for optical materials, for optical elements that require a high refractive index and high light transmittance as represented by a lens sheet such as a Fresnel lens and a lenticular lens used for a video projector, a projection television and a liquid crystal display, and a plastic lens.

What is claimed is:

1. An optical material cured by exposing an active energy beam-curable composition for optical material to an active energy beam, the composition consisting of unsaturated group-containing monomers and optionally one or more components selected from the group consisting of a photoinitiator, pigment, dye, an antifoaming agent, a leveling agent, an inorganic filler, an organic filler, a light stabilizer, an oxidation inhibitor, an ultraviolet absorbing agent, a polymerization inhibitor, and a thermal polymerization initiator, the unsaturated group-containing monomers consisting of
(a) (A) a di(meth)acrylate represented by the following formula (1) (component (A)) and (B) a mono(meth)acrylate represented by the following formula (2) (component (B)); or
(b) the component of (A), the component (B), and (D) an unsaturated group-containing monomer other than the components (A) and (B), wherein (D) the unsaturated group-containing monomer other than the components (A) and (B) is a compound selected from the group consisting of phenoxyethyl (meth)acrylate, carbitol (meth)acrylate, N-vinyl caprolacton, acryloyl morpholine, glycidyl (meth)acrylate, 2-hydroxyethyl (meth)acrylate, 2-hydroxypropyl (meth)acrylate, 1,4-butanediol mono(meth)acrylate, 1,6-hexanediol di(meth)acrylate, nonanediol diacrylate, polyethylene glycol di(meth)acrylate, 2-hydroxy-3-phenyloxypropyl (meth)acrylate, tribromophenyl (meth)acrylate, 2,2-bis(4-(meth)acryloyloxyethoxyphenyl-propane, 2,2-bis(4-(meth) acryloyloxydiethoxyphenyl)-propane, 2,2-bis(4-(meth)acryloyloxytriethoxyphenyl)-propane, ethylene glycol di(meth) acrylate, tribromophenyloxyethl (meth)acrylate, trimethylolpropane tri(meth)acrylate, pentaerythritol tetra(meth)acrylate, bisphenol A epoxy resin di(meth) acrylate, polyurethane poly(meth)acrylate and polyester poly(meth)acrylate;

wherein the composition contains 10 to 90 wt % of the component (A) and 90 to 10 wt % the component (B) on the basis of the total weight of the components (A) and (B):

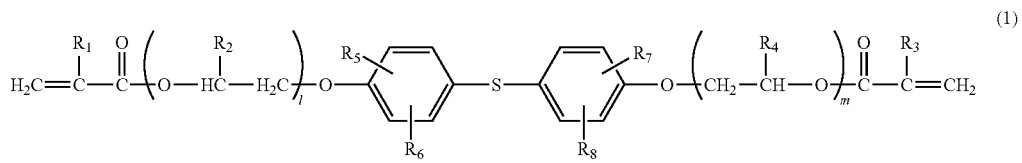

wherein $R_1$ and $R_3$ independently represents a hydrogen atom or a methyl group, $R_2$ and $R_4$ independently represents a hydrogen atom, a methyl group or an ethyl group, $R_5$ to $R_8$ independently represents a hydrogen atom, a methyl group or a bromine atom, and l and m independently represents an integer of 1 to 6; and

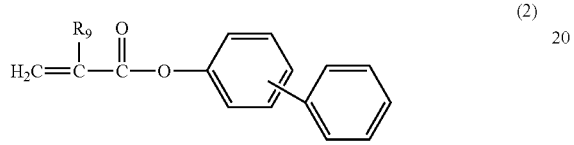

wherein $R_9$ represents a hydrogen atom or a methyl group.

2. The optical material according to claim 1, wherein each of $R_1$ and $R_3$ is a hydrogen atom in the formula (1).

3. The optical material according to claim 1, wherein each of $R_2$ and $R_4$ is a hydrogen atom in the formula (1).

4. The optical material according to claim 1, wherein all of $R_5$ to $R_8$ are hydrogen atoms; $R_5$ is a hydrogen atom and $R_6$ is a methyl group, and $R_7$ is a hydrogen atom and $R_8$ is a methyl group; or $R_5$ is a hydrogen atom and $R_6$ is a bromine atom, and $R_7$ is a hydrogen atom and $R_8$ is a bromine atom.

5. The optical material according to claim 1, wherein each of l and m is an integer of 1 to 3.

6. The optical material according to claim 1, wherein the component (A) is bis(4-acryloxyethoxyphenyl) sulfide, bis(4-acryloxydiethoxyphenyl) sulfide, bis(4-acryloxyethoxy-3-methylphenyl) sulfide or bis(4-acryloxydiethoxy-3-methylphenyl) sulfide.

7. The optical material according to claim 1, wherein the mono(meth)acrylate represented by the formula (2) is o-phenylphenyl (meth)acrylate.

8. The optical material according to claim 1, wherein (C) a photoinitiator is present in the composition.

9. The optical material according to claim 1, wherein the composition contains 30 to 90 wt % of the component (A) and 70 to 10 wt % of the component (B).

10. The optical material according to claim 1 having a refractive index (25° C.) of 1.59 or more.

11. The optical material according to claim 1, wherein the optical material is a lens sheet or a plastic lens.

12. A method for producing an optical material comprising:
a step of applying or pouring an active energy beam-curable composition for optical material to a casting mold having a predetermined shape, wherein the composition consists of unsaturated group-containing monomers and optionally one or more components selected from the group consisting of a photoinitiator, pigment, dye, an antifoaming agent, a leveling agent, an inorganic filler, an organic filler, a light stabilizer, an oxidation inhibitor, an ultraviolet absorbing agent, a polymerization inhibitor, and a thermal polymerization initiator,
the unsaturated group-containing monomers consisting of
(a) (A) a di(meth)acrylate represented by the following formula (1) (component (A)) and (B) a mono(meth)acrylate represented by the following formula (2) (component (B)); or
(b) the component of (A), the component (B), and (D) an unsaturated group-containing monomer other than the components (A) and (B),
wherein (D) the unsaturated group-containing monomer other than the components (A) and (B) is a compound selected from the group consisting of phenoxyethyl (meth)acrylate, carbitol (meth)acrylate, N-vinyl caprolacton, acryloyl morpholine, glycidyl (meth)acrylate, 2-hydroxyethyl (meth)acrylate, 2-hydroxypropyl (meth)acrylate, 1,4-butanediol mono(meth)acrylate, 1,6-hexanediol di(meth)acrylate, nonanediol diacrylate, polyethylene glycol di(meth)acrylate, 2-hydroxy-3-phenyloxypropyl (meth)acrylate, tribromophenyl (meth)acrylate, 2,2-bis(4-(meth)acryloyloxyethoxyphenyl-propane, 2,2-bis(4-(meth)acryloyloxydiethoxyphenyl)propane, 2,2-bis(4-(meth)acryloyloxytriethoxyphenyl)-propane, ethylene glycol di(meth)acrylate, tribromophenyloxyethyl (meth)acrylate, trimethylolpropane tri(meth)acrylate, pentaerythritol tetra(meth)acrylate, bisphenol A epoxy resin di(meth)acrylate, polyurethane poly(meth)acrylate and polyester poly(meth)acrylate;
wherein the composition contains 10 to 90 wt % of the component (A) and 90 to 10 wt % of the component (B) on the basis of the total weight of the components (A) and (B), and
a step of irradiating an active energy beam after the applying or pouring;

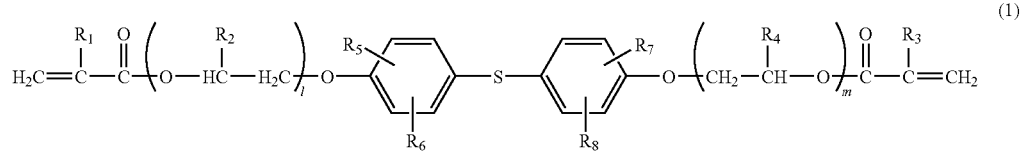

wherein R₁ and R₃ independently represents a hydrogen atom or a methyl group, R₂ and R₄ independently represents a hydrogen atom, a methyl group or an ethyl group, R₅ to R₈ independently represents a hydrogen atom, a methyl group or a bromine atom, and l and m independently represents an integer of 1 to 6; and

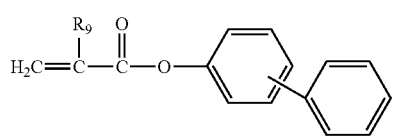
(2)

wherein R₉ represents a hydrogen atom or a methyl group.

13. The method for producing an optical material according to claim 12, wherein each of R₁ and R₃ is a hydrogen atom in the formula (1).

14. The method for producing an optical material according to claim 12, wherein each of R₂ and R₄ is a hydrogen atom in the formula (1).

15. The method for producing an optical material according to claim 12, wherein all of R₅ to R₈ are hydrogen atoms; R₅ is a hydrogen atom and R₆ is a methyl group, and R₇ is a hydrogen atom and R₈ is a methyl group; or R₅ is a hydrogen atom and R₆ is a bromine atom, and R₇ is a hydrogen atom and R₈ is a bromine atom, in the formula (1).

16. The method for producing an optical material according to claim 12, wherein each of l and m is an integer of 1 to 3 in the formula (1).

17. The method for producing an optical material according to claim 12, wherein the component (A) is bis(4-acryloxyethoxyphenyl) sulfide, bis(4-acryloxydiethoxyphenyl) sulfide, bis(4-acryloxyethoxy-3-methylphenyl) sulfide or bis(4-acryloxydiethoxy-3-methylphenyl) sulfide.

18. The method for producing an optical material according to claim 12, wherein the mono(meth)acrylate represented by the formula (2) is o-phenylphenyl (meth)acrylate.

19. The method for producing an optical material according to claim 12, wherein (C) a photoinitiator is present in the composition.

20. The method for producing an optical material according to claim 12, wherein the active energy beam-curable composition contains 30 to 90 wt % of the component (A) and 70 to 10 wt % of the component (B).

21. An optical material cured by exposing an active energy beam-curable composition for optical material to an active energy beam, the composition comprising (A) a di(meth)acrylate represented by the following formula (1) (component (A)) and (B) a mono(meth)acrylate represented by the following formula (3) (component (B)), wherein the composition contains 10 to 90 wt % of the component (A) and 90 to 10 wt % the component (B) on the basis of the total weight of the components (A) and (B):

wherein R₁ and R₃ independently represents a hydrogen atom or a methyl group, R₂, and R₄ independently represents a hydrogen atom, a methyl group or an ethyl group, R₅ to R₈ independently represents a hydrogen atom, a methyl group or a bromine atom, and l and m independently represents an integer of 1 to 6; and

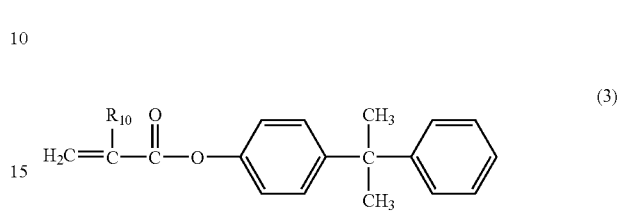
(3)

wherein R₁₀ represents a hydrogen atom or a methyl group.

22. The optical material according to claim 21, wherein the mono(meth)acrylate represented by formula (3) is p-cumylphenol (meth)acrylate.

23. The optical material according to claim 1, wherein the di(meth)acrylate represented by formula (1) is bis(4-acryloxyethoxyphenyl) sulfide and the mono(meth)acrylate represented by formula (2) is o-phenylphenyl (meth)acrylate.

24. The optical material according to claim 21, wherein the di(meth)acrylate represented by formula (1) is bis(4-acryloxyethoxyphenyl) sulfide and the mono(meth)acrylate represented by formula (3) is p-cumylphenol (meth)acrylate.

25. The optical material according to claim 1, wherein the composition contains 0 to 50% of the component (D).

26. A method for producing an optical material comprising:

a step of applying or pouring an active energy beam-curable composition for optical material to a casting mold having a predetermined shape, wherein the composition comprises (A) a di(meth)acrylate represented by the following formula (1) (component (A)) and (B) a mono (meth)acrylate represented by the following formula (3) (component (B)), wherein the composition contains 10 to 90 wt % of the component (A) and 90 to 10 wt % of the component (B) on the basis of the total weight of the components (A) and (B), and a step of irradiating an active energy beam after the applying or pouring;

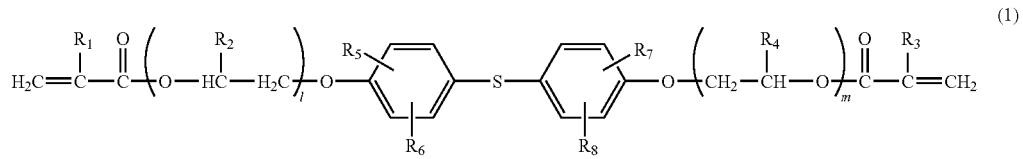
(1)

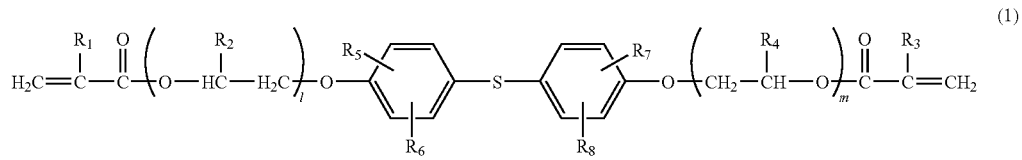

(1)

wherein $R_1$ and $R_3$ independently represents a hydrogen atom or a methyl group, $R_2$ and $R_4$ independently represents a hydrogen atom, a methyl group or an ethyl group, $R_5$ to $R_8$ independently represents a hydrogen atom, a methyl group or a bromine atom, and l and m independently represents an integer of 1 to 6; and

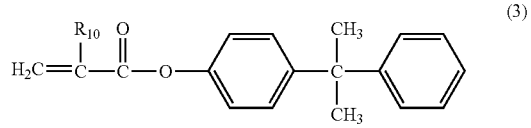

(3)

wherein $R_{10}$ represents a hydrogen atom or a methyl group.

27. The method for producing an optical material according to claim 26, wherein the mono(meth)acrylate represented by formula (3) is p-cumylphenol acrylate.

28. The method for producing an optical material according to claim 12, wherein the di(meth)acrylate represented by formula (1) is bis(4-acryloxyethoxyphenyl) sulfide and the mono(meth)acrylate represented by formula (2) is o-phenylphenyl (meth)acrylate.

29. The method for producing an optical material according to claim 26, wherein the di(meth)acrylate represented by formula (1) is bis(4-acryloxyethoxyphenyl) sulfide and the mono(meth)acrylate represented by formula (3) is p-cumylphenol (meth)acrylate.

30. The method for producing an optical material according to claim 12, wherein the composition contains 0 to 50% of the component (D).

* * * * *